United States Patent [19]

Sumi

[11] Patent Number: 4,465,344
[45] Date of Patent: * Aug. 14, 1984

[54] CAM DEVICE FOR A PHOTOGRAPHING LENS BARREL

[75] Inventor: Akiyasu Sumi, Kanagawa, Japan

[73] Assignee: Canon Kabushiki Kaisha, Japan

[*] Notice: The portion of the term of this patent subsequent to Jun. 7, 2000 has been disclaimed.

[21] Appl. No.: 319,959

[22] Filed: Nov. 10, 1981

[30] Foreign Application Priority Data

Nov. 13, 1980 [JP] Japan .............................. 55-162243[U]

[51] Int. Cl.$^3$ ................................................ G02B 7/10
[52] U.S. Cl. ...................................... 350/429; 350/255
[58] Field of Search ................................ 350/429, 255

[56] References Cited

U.S. PATENT DOCUMENTS 3,506,338  4/1970  Holderbaum ....................... 350/429
4,386,829  7/1983  Sumi ................................... 350/429

Primary Examiner—John K. Corbin
Assistant Examiner—Rebecca D. Gass
Attorney, Agent, or Firm—Toren, McGeady and Stanger

[57] ABSTRACT

A cam device of a lens barrel having a cam follower member which satisfies the condition $$R > r_2 > r_1,$$

wherein R is the minimum radius of a cam curve of a cam which contributes to movement of a lens placed within the lens barrel, $r_1$ is the radius of a cutter to form the cam, and $r_2$ is the radius of a part of a cam follower member which contacts the cam curve and regulates movement of a lens, being a part other than that contacting a cam surface.

4 Claims, 9 Drawing Figures

CAM DEVICE FOR A PHOTOGRAPHING LENS BARREL

BACKGROUND OF THE INVENTION

1. Field of the Invention

The present invention relates to a cam device for a photographic lens barrel.

2. Description of the Prior Art

Devices which move a lens optical system of an exchangeable lens along an optical axis to effect focusing or a magnification varying function are well known.

A magnification varying lens optical system and a compensation lens optical system are moved for a prescribed distance for effecting a magnification varying action, performing the magnification varying action and a compensation action simultaneously for effecting a zooming action. For control of the movement of each of the lens optical systems for this zooming operation an arrangement is employed such that a cam ring which is inserted and mounted on an inner or outer circumference of a fixed barrel of an exchangeable lens is provided and a guide groove having a spiral form is formed on the cam ring around an optical axis. At the same time, a straight forward groove in the direction of the optical axis is provided on the fixed barrel. Furthermore, a lens barrel to hold each of the lens optics is inserted into an inner circumference of the fixed barrel or the cam ring, and a pin is mounted on the lens barrel, the pin being arranged to extend through the guide groove and the straight forward groove. Each of the lens barrels is moved, by a straight forward operation or a rotating operation of an operation ring placed on an outermost position, by the amount of a shifting in the direction of the optical axis of the spiral guide groove of the cam ring, thereby varying the distance between the magnification varying lens optical system and the compensation lens optical system for effecting zooming.

A cam ring having a guide groove with a spiral form in the above-mentioned conventional exchange lens greatly affects the accuracy during zooming of the exchange lens and the cost thereof detracts from the possibility of mass production. That is, in a conventional exchangeable lens of a zoom lens assembly, the above-mentioned guide groove of the cam ring is formed by a cutting fabrication through the ring. Therefore, it is difficult to mass produce by machine fabrication, and it is necessary to produce a good finish with a fabricating precision in a plane of the groove of said guide groove. Thus, it is costly to secure a satisfactory preciseness, and hence it is difficult to reduce the cost or to enhance the precision.

Further, when the degree of inclination of the guide groove of a conventional cam ring is made large, the amount of shifting of each of the lens optical systems for an amount of movement of a zooming operation ring can be made larger thereby resulting in an overall dimension for the exchange lens which is shorter, thus enabling provision of a compact exchangeable lens with somewhat reduced weight.

However, if the degree of inclination of the guide groove is large, it adversely affects the physical strength of the cam ring. Therefore, the degree of the inclination of the guide groove relative to the optical axis must be limited to a prescribed range, and the dimension in the direction of the optical axis of the cam ring becomes longer. Thus, the distance through which the operation ring must move increases accordingly, and the length of the zoom lens assembly becomes longer and becomes inconvenient to carry.

Also a shifting mechanism having a conventional cam ring in a zoom lens involves problems in that a bearing or roller fixed on a pin mounted on an outer circumference of the lens barrel abuts on a plane of a guide groove of the cam ring. Therefore, when an impact force is imparted to a front plane of the exchange lens from outside or the lens is placed in a vertical position, an impacting force is exerted on the bearing or roller which is fitted in the groove of the cam ring. This force causes damage to the plane of the groove or generates uneven surfaces of the plane, thus causing an irregular feeling during zooming operation or lowering of the zooming accuracy.

As a method of solving the aforementioned problems in the cam ring of a zoom lens, there has been proposed forming the cam ring by a mold forming process of synthetic resin material as disclosed in U.S. Pat. No. 3,506,338.

However, in U.S. Pat. No. 3,506,338, one of two lens elements is pressed against a curvilinear shoulder 4 of a cam member by a spring member to effect control of the shifting movement along the curvature of the curvilinear shoulder. The system of U.S. Pat. No. 3,506,338 employs an arrangement wherein a spring 14 is biased between lens mounts to have a pin 13 pressed against a cam curvature thereby effecting control of shifting of two lens components 5, 6. This results in an increase in the number of component parts of the lens shifting mechanism and an increase in work during the assembly and the fabrication process which does not contribute to reducing cost.

The present application has previously proposed a structure for a lens barrel for the purpose of enhancing the optical and mechanical accuracy of the conventional lens barrel which is disclosed in U.S. application Ser. No. 166,825, now U.S. Pat. No. 4,386,829.

The lens barrel disclosed in said application as shown in FIG. 1 and FIG. 2 thereof comprises a tubular member 2 having a long linear guide groove 2a extending in a direction of the optical axis as shown in FIG. 1, and a mounting member not being shown in the drawing provided in the rear of the tubular member 2 for fixing the lens assembly on a camera. A second tubular member 3 supports a holding frame 4 of a first movable lens group $L_1$ and is inserted into the inside of the tubular member 2.

A focusing operation ring 5 operates to shift the first movable lens group $L_1$ forwardly and rearwardly along the optical axis, O—O', to effect a focusing operation. The focusing operation ring is integrally formed with the lens holding frame 4. A threaded part 4a formed at an outer circumference of the lens holding frame 4 is threadedly engaging with a threaded part 3a formed at an inner circumference of the second tubular member 3, and pulls out of the lens $L_1$ by a rotating operation of the focusing operation ring 5 around the optical axis, to effect focusing.

A cam tube member 6 is placed around the outside of the tubular member 2 and is arranged to be rotatable around the optical axis on an outer circumference of the tubular member 2, and is prevented from shifting in the direction of the optical axis.

The cam tube member 6 has a projection part 6a having a rectangular cross section located at the hollow inner circumference of the member 6 as shown in FIG.

2, and one side of said projection part 6a is finished into a cam surface and controls movement of the first movable lens group $L_1$ through a cam follower which is to be described later. The cam follower is placed between the cam tube member 6 and the second tubular member 3. The cam follower consists of a key member 7, a contacting piece 8 and a stop member 9, etc., which are inserted into the guide groove 2a as shown in FIG. 3 to FIG. 7 of the aforementioned application Ser. No. 166,825, wherein the contacting piece 8 is a roller.

The key member 7 and the roller 9 are fixed on the second tubular member 3 by a screw 10. The roller 8 is threadedly held in place by the screw 10 so as to be rotatable against the axis of the screw 10. One end of the key member 7 extends under the projection 6a of the cam part and further extends in a direction of the forward end of the lens, and the stop member 9 is placed on one end 7a of the thus extended key member 7 so as to go through the guide groove 2a.

The stop member 9 consists of a pin part 9a and a boss part 9b, and the boss part 9b is made to be insertable into a groove 7b of the key member 7, and the pin part 9a is pulled by a spring 11 placed within the groove 7b and presses the roller 8 against the cam surface.

A second lens holding frame 12 holds a second movable lens group $L_2$ and is inserted into the tubular member 2. Movement of the second movable lens group $L_2$ is controlled by a cam surface of a second projection (not being shown in the drawing) with a rectangular cross section provided at an inner circumference of the cam tube member 6, and the arrangement of its cam follower is exactly the same as that mentioned above in reference to FIG. 3 to FIG. 7, thus its explanation is omitted here.

A diaphragm device 13 is held in place by the second lens holding frame. A diaphragm aperture value setting ring 14 is inserted and mounted on the tubular member 2 and is associated with the diaphragm device to manually adjust the diaphragm aperture to a desired value. Since the arrangement of the diaphragm aperture setting ring 14 and the diaphragm device 13 may be of the conventionally known type, an explanation thereof is omitted.

The cam tube member 6 in the present invention can be made by a mold forming process of synthetic resin material (for example, polycarbonate).

When a strong impact is imparted to the lens assembly from a direction of an arrow shown in FIG. 1 of the present application to the front end of the lens, if a conventional cam follower is used the springs are made to expand by this force and the cam follower retreats from the cam surface, and the stopper pin then abuts on a protecting wall plane, where the force is stopped. When a plastics molded part is used in said cam, a pressure mark is generated at the protecting wall plane as shown in FIG. 3, and the pressure mark will become larger as the impact force becomes larger, and eventually the pressure mark will become so large as to effect normal zooming operation. The force is directed from a forward end of the lens toward the rear or mount side. However, when a force is applied in the reverse direction, since a gap t between the cam surface and the cam follower does not exist, there is no space for the spring force, and the undesirable effect will become greater. The resulting damage on the cam surface can be a critical defect for a zoom lens.

BRIEF DESCRIPTION OF THE DRAWINGS

FIG. 2 is a plan view of part of the cam device shown in FIG. 1. FIG. 3 is a schematic view to show the effect on a cam when an impact force is imparted from the front end of the lens barrel of FIG. 1.

FIG. 4 is a cross sectional view in an axial direction, wherein the upper part shows the lens system moved to the wide angle position and the lower part shows the lens system moved to the telescopic position.

FIG. 5 is a cross sectional view of an important part of a cam device taken in the direction of the optical axis of FIG. 4. FIG. 6 is a cross sectional view taken along B1-B2 in FIG. 5. FIG. 7 is an exploded perspective view depicting the relationship between a key member 30, a cam follower 32, a stopper 38 and a cam 28A in the B1-B2 direction of FIG. 5. The cam 28A is shown by a dot chain line.

FIG. 8A and FIG. 8B show another example of the present invention, wherein FIG. 8A is an oblique view of an important part, while FIG. 8B is a cross sectional view of an important part.

SUMMARY OF THE INVENTION

The present invention is intended to provide a lens barrel with a structure wherein shortcomings of the prior art can be eliminated.

The invention is particularly intended to enhance smoothness in the shifting of the lens and to improve the operating characteristics of the cam device.

Further, the present invention is intended to provide a lens having a high impact resisting strength and good quality wherein adverse effects will not be generated on a movement locus of the movable lenses by an impact on the lens barrel in the cam device.

DESCRIPTION OF THE PREFERRED EMBODIMENT

Figure 1:
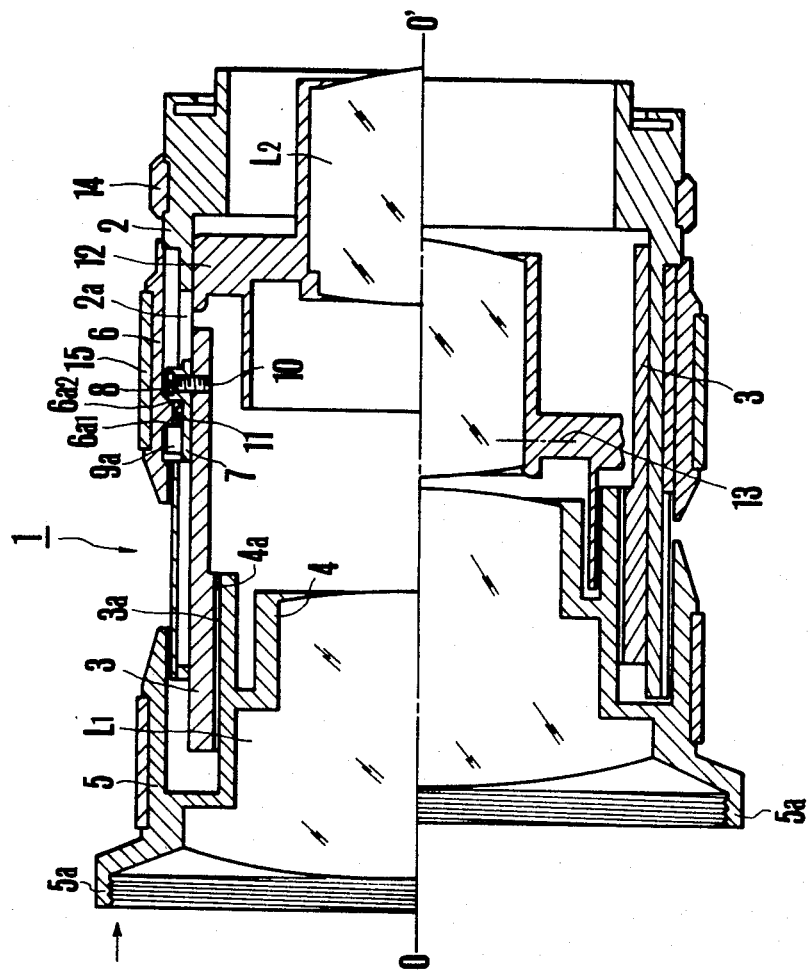
FIG. 1 to FIG. 3 depict an arrangement of a cam device in accordance with the prior art, with FIG. 1 being a cross sectional view in the axial direction, wherein the upper part shows the lens optical system moved to a wide angle and the lower part shows the system moved to a telescopic position.
Figure 2:
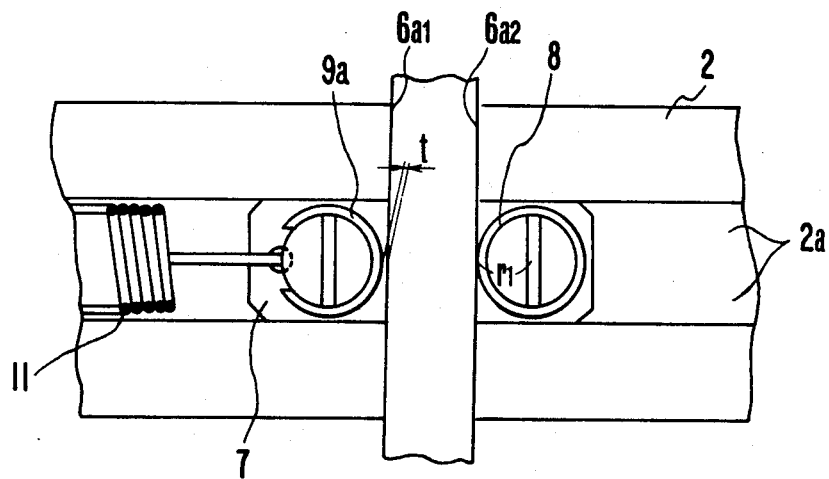
Figure 3:
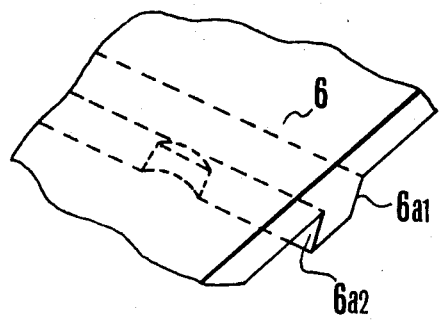
Figure 4:
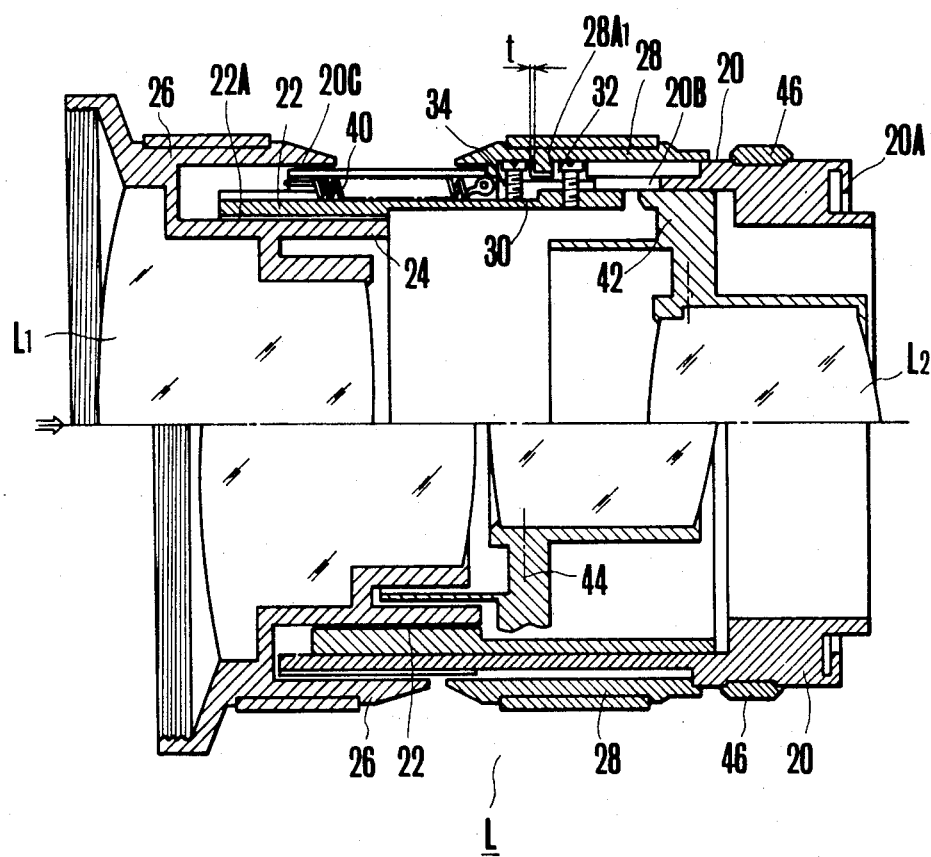
FIG. 4 to FIG. 7 depict an example of a lens barrel according to the present invention.
Figure 5:
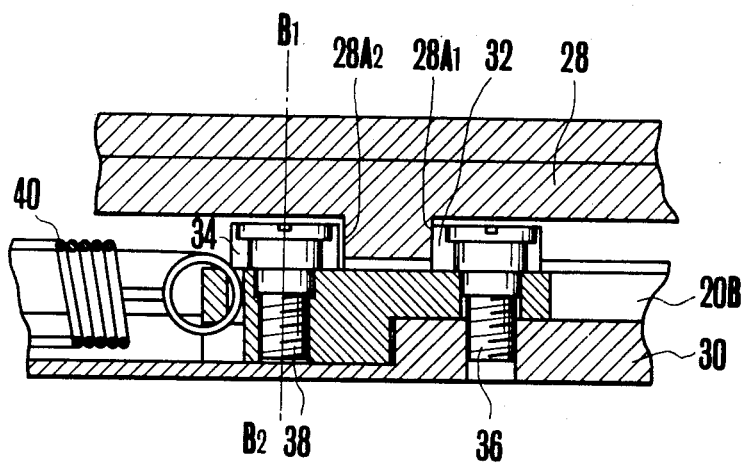

FIG. 4 and FIG. 5 show an example in which the present invention is applied to a zoom lens assembly.

A fixed barrel member 20 is provided in a zoom lens assembly represented by L, and a conventionally known mounting means 20A is attached to one end of the member 20. A helicoid tube 22 is inserted into an inner circumference of the fixed lens barrel 20. The helicoid 22 has a first lens holding member 24 fitted at its inner circumference in a manner threadedly fitted by a helicoidal part 22A. The first lens holding member 24 is integrally combined with a focusing operation member 26 by a screw member not shown in the drawing.

A zooming operation member 14 is fitted around an outer circumference of the fixed lens barrel and is rotatable around the optical axis and at the same time has a projection part 28A at its inner circumference which, as shown in FIG. 4, has one side 28A$_1$ of said projection part finished into a cam surface having a prescribed amount of shifting for controlling a shifting of the first lens holding member in the direction of the optical axis.

A key member 30, a cam follower member 32, a stop member 34, screws 36, 38 and a spring member 40 constitute a cam device of the present invention.

Figure 6:
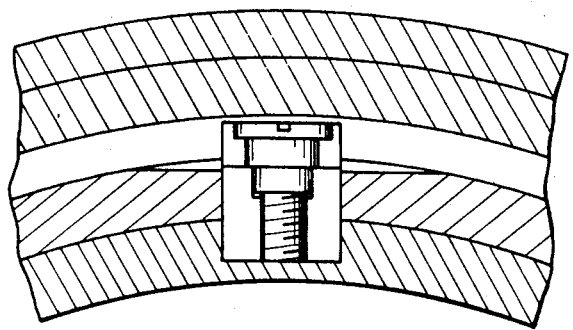
Figure 7:
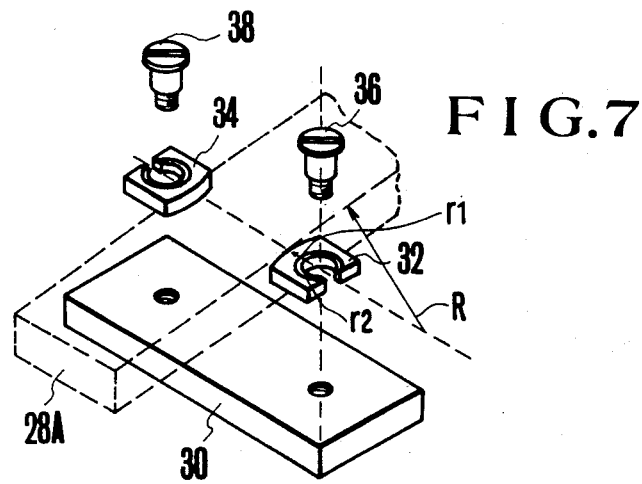

The fixed lens barrel 20 has a vertical groove 20B formed therein along the direction of the optical axis as shown in FIG. 5 and in FIG. 6. The key member 30 is inserted in engagement in said vertical groove 20B and the cam follower member 32 and the stop member 34 are retained at the key member 30 sandwiching the projection cam part 28A. The cam follower member 32 and the stop member 34 are formed in a C-shape as shown in FIG. 7 and are retained by the stepped screws 36, 38, respectively.

The spring member 40 is extended between the key member 30 and the other end 20C of the fixed lens barrel to press the cam follower member 32 against the cam surface $28A_1$. The stop member 34 is so made that a constant gap t is always maintained by the spring member 40 between itself and the projection part.

A second lens holding member 42 fitted in engagement to an inner circumference of the fixed lens barrel 20, and control of its movement in the direction of the optical axis is effected by a rotating action of the zooming operation member 28 through a helicoidal mechanism not shown in the drawing.

A diaphragm device 44 is held in place by the second lens holding member 42 and is so arranged that it can be associated with a diaphragm operating member 46 by conventionally known means.

$L_1$ is a first movable lens held by the above-mentioned first lens holding member 24, and $L_2$ is a second movable lens held by the second lens holding member 42.

Figure 5A:
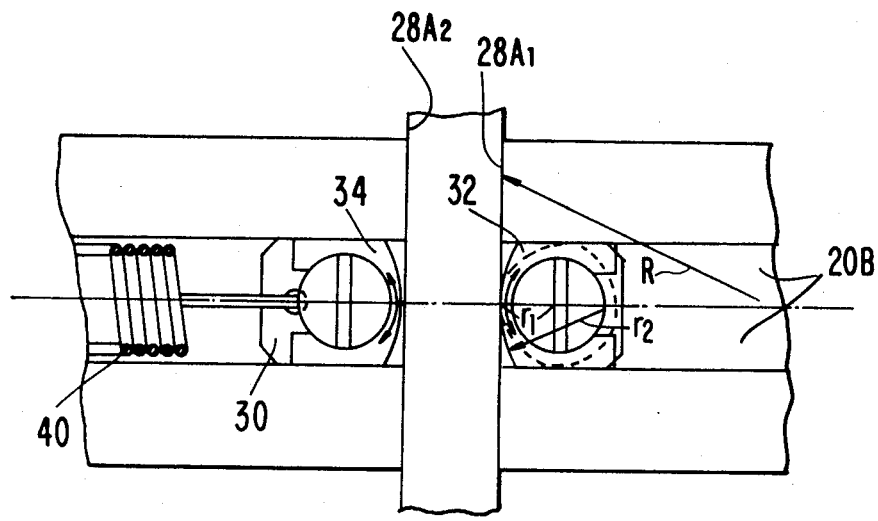
FIG. 5A is a plan view showing further details of the invention.

Now, with reference to the cam follower and stopper shown in FIG. 4 and FIG. 5, a radius of the cam follower at a part at which the cam follower abuts on the cam surface is the same as the radius of a cutter to form the cam surface, that is $r_1$ (See FIG. 5A), but the radius thereof at a part other than said part is $r_2$ (See FIG. 5A) and is larger than $r_1$, wherein when an outside force is imparted, planes with $r_1$ and $r_2$ will receive the force. Thus, the load will be received by the total width of the cam follower, eliminating a local load, whereby damage on the cam surface can be avoided. Also, particularly when a cam is formed with plastic material, the load can be sufficiently supported within an elastic deformation limit of the cam surface by suitably selecting $r_2$. The same is applicable to the stopper member. But, $r_2$ needs to be made smaller than the minimum curvature R within a range of a cam curve. This is because the cam follower side is required to contact with the cam surface always with an $r_1$ part.

Also the radius of a cutter to fabricate a cam when the cam has a protruding shape can be regarded as a radius of a cutter to fabricate a mold when the cam is made by a mold.

Further, for the purpose of providing a smooth operation characteristic for the lens barrel in the example shown in FIG. 4 to FIG. 7, and as an arrangement to precisely transmit a shifting of the cam surface $28A_1$ to the cam follower member 32, the cam follower member 32 is held in place by the fixing screw 36 in a swingable manner, thereby enlarging a contacting plane of the cam follower member 32 with the cam follower $28A_1$. And as a result a smooth movement of the cam follower member 32 and a precise shifting of the same can be secured.

Figure 8A:
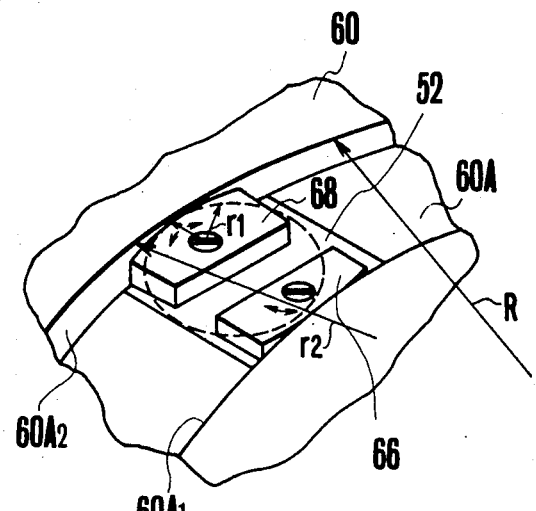
Figure 8B:
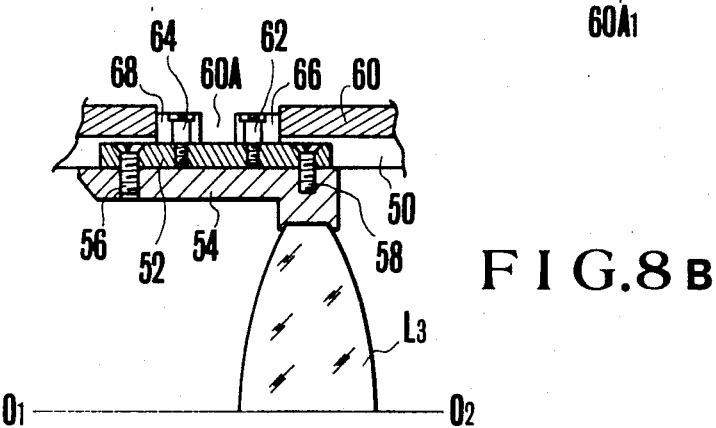

FIGS. 8A, and 8B show another example of the present invention. In FIGS. 8A and 8B, a vertical groove 50 is formed in a fixed lens barrel, and a key member 52 engages with the vertical groove 50, with a lens holding member 54 which holds a movable lens $L_3$ being fixed to the key member 52 by screws 56 and 58.

An operating member 60 is placed around the fixed lens barrel and it may be used for focusing or for zooming. A cam groove 60A is formed at the operating member 60, and cam followers 66 and 68 installed in a rotatable manner to the key member 52 by stepped screws 62, 64 are so provided in the cam groove 60A that they will contact with a cam surface 60A.

The relationship between respective radii and curvatures of the cam follower 66 and 68, and the cam surface $60A_1$ shown in FIGS. 8A and 8B and a cutter to fabricate the cam will be the same as those in what is shown in FIG. 4 to FIG. 7.

When the operating member 60 is rotatingly operated around an optical axis, $O_1-O_2$, in the example shown in FIGS. 8A and 8B, since the key member 52 is engaged with a crossing point of the cam groove 60A and the vertical groove 50, the key member 52 is shifted along with a shifting of the crossing point in the direction of the optical axis.

Also in the above arrangement, a smooth movement and an exact control can be expected by making the value of the radius of a contacting plane of each of the cam followers 66 and 68 larger than the value of the radius of a cutter to fabricate curvatures $60A_1$, $60A_2$ of the cam 60A.

While the example shown in FIG. 4 to FIG. 7 is for a cam mechanism for a shifting control of a movable optical system of a zooming lens, it can also be applied to a cam device for a focusing optical system.

That is, in FIG. 4, an arrangement is employed such that the first lens group $L_1$ and the second lens group $L_2$ are provided, and the first lens group $L_1$ performs a focusing function by a rotation of the focusing operation member 26, while the lens groups $L_1$ and $L_2$ are controlled with a prescribed shifting lens by a rotating operation of the zooming operation member 28. Also the optical system $L_1$ can be used as a focusing optical system so that a cam device consisting of the cam part 28A, the cam follower 32, the stopping means 34 and the key member 30, etc. may be used for a focusing operation.

As has been explained above, by employing a cam follower according to the present invention, it has become possible to provide a lens barrel which will have no problems in strength, yet have satisfactory quality, performance and accuracy even if plastics molded parts are used in the cam.

While specific embodiments of the invention have been shown and described it detail to illustrate the application of the inventive principles, it will be understood that the invention may be embodied otherwise without departing from such principles.

What is claimed is:

1. A photographing lens assembly including a cam device, comprising:
   (a) a fixed lens barrel member extending in the direction of an optical axis of said assembly;
   (b) a focusing operation member which is mounted on said fixed lens barrel and is rotated around the optical axis, said member having a protrudent cam part formed at its inner circumference;

(c) a lens holding member which is movable in the direction of the optical axis and which holds a lens optical system;

(d) cam follower means to control a movement of said lens holding member according to the amount of movement of the cam part, said cam follower means consisting of:

a cam follower member held in place by a mounting member on the lens holding member, said cam follower member being pressed against a cam surface of the cam part by spring means, and having a curvature of a contacting surface to satisfy the following formula:

$$R > r > r_1,$$

wherein

R: a value of the minimum radius of a cam curve of a cam surface of the cam part;

$r_1$: a value of a radius of a cutter to fabricate the cam curve of a cam surface, or a value of a radius of a cutter of a die to form the cam; and r: a value of a radius of a contacting plane of said cam follower member.

2. A zoom lens assembly including a cam device, comprising:

(a) a fixed lens barrel member extending in the direction of an optical axis of said assembly;

(b) a zooming operation member which is mounted on said fixed lens barrel and rotatable around the optical axis to effect a zooming action, said zooming operation member having a protrudent cam part formed at its inner circumference;

(c) a lens holding member which holds a lens and is movable in the direction of the optical axis to contribute to a zooming action; and (d) a cam follower member which is held in place by a mounting member on the lens holding member, said cam follower member being constructed to be rotatable around said mounting member and at the same time being held in place by said mounting member, and having a contacting plane with said cam part in a condition to satisfy the following formula:

$$r > r_1$$

wherein r: a value of a radius of a contacting plane of said cam follower member; and $r_1$: a value of a radius of a cutter to fabricate a cam curve of the cam surface, or a value of a radius of a cutter of a due to form the cam surface.

3. An assembly according to claim 1 or 2, further comprising:

a vertical groove formed on the fixed lens barrel in a parallel direction with the optical axis, and a key member inserted into said vertical groove, said key member being retained on the lens holding member together with the cam follower means by said mounting member, wherein the cam follower member controls movement of the lens holding member in the direction of the optical axis being rotated following the contacting plane of the cam part according to rotating operation of the zooming operation member.

4. A photographing lens assembly including a cam device, comprising:

(a) a fixed lens barrel member extending in the direction of an optical axis of said assembly, said member having a groove formed in the direction of the optical axis;

(b) a movable lens and an operation member to move said movable lens in the direction of the optical axis, said operation member being positioned in a rotatable manner around the fixed lens barrel, and having a cam groove to determine the amount of movement of the movable lens;

(c) a lens holding member holding said movable lens; and (d) a cam device which consists of a key member engaging with the groove of the fixed lens barrel and a cam follower contacting with a cam surface of the cam groove, wherein said cam follower is retained in a swingable manner on the key member and at the same time a value of a radius of a contacting plane of the cam follower is set at a value larger than the value of the radius of a cutter to fabricate the cam surface.

* * * * *

UNITED STATES PATENT AND TRADEMARK OFFICE
CERTIFICATE OF CORRECTION

PATENT NO. : 4,465,344
DATED : August 14, 1984
INVENTOR(S) : Akiyasu Sumi

It is certified that error appears in the above-identified patent and that said Letters Patent is hereby corrected as shown below:

On the title page, title of invention should read

-- [54] CAM DEVICE FOR A PHOTOGRAPHIC LENS BARREL --

Signed and Sealed this

Twelfth Day of March 1985

[SEAL]

Attest:

DONALD J. QUIGG

Attesting Officer     Acting Commissioner of Patents and Trademarks